United States Patent

[11] 3,541,937

[72] Inventor Hubert Nerwin
  Rochester, New York
[21] Appl. No. 675,597
[22] Filed Oct. 16, 1967
[45] Patented Nov. 24, 1970
[73] Assignee Eastman Kodak Company
  Rochester, New York
  a corporation of New Jersey

[54] CAMERA AND METHOD FOR EXPOSING AND DEVELOPING SLIDE TRANSPARENCY UNITS
  35 Claims, 10 Drawing Figs.

[52] U.S. Cl. ................................................. 95/13,
  95/89
[51] Int. Cl. ........................................... G03b 17/50
[50] Field of Search ................................. 95/13, 19,
  23, 89, 12, 25, 26; 96/64, 76, consulted

[56] References Cited
  UNITED STATES PATENTS
  478,780  7/1892  Bristol ........................... 95/26

3,350,990  11/1967  Finelli et al. ................... 95/13

*Primary Examiner*—John M. Horan
*Assistant Examiner*—Richard L. Moses
*Attorneys*—Robert W. Hampton and Gary D. Fields ABSTRACT: A camera is provided in which slide transparency units can be transported from a storage chamber to another chamber for exposure and development. Each transparency unit includes first and second pods containing developing agents. A simple slide mechanism moves successive units from the storage chamber to the exposure chamber, and is adapted to rupture the first pod and spread a first developing agent therefrom across the transparency as the slide is moved back toward the storage chamber. After a suitable development period, the slide is again moved toward the exposure chamber, transporting a succeeding transparency unit into exposure position. The latter movement forces the first transparency unit out of the camera, and simultaneously ruptures the second pod and spreads a second developing or fixing agent therefrom across the transparency.

Patented Nov. 24, 1970

HUBERT NERWIN
INVENTOR.

BY Gary D. Fields
Robert W Hampton

ATTORNEYS

Patented Nov. 24, 1970

HUBERT NERWIN
INVENTOR.

BY Gary D. Fields
Robert W Hampton

ATTORNEYS 3,541,937

CAMERA AND METHOD FOR EXPOSING AND DEVELOPING SLIDE TRANSPARENCY UNITS

CROSS-REFERENCE TO RELATED APPLICATION

The camera of this invention could utilize the transparency unit disclosed in my copending U.S. Pat. application Ser. No. 675,608, filed Oct. 16, 1967.

BACKGROUND OF THE INVENTION

1. Field of the Invention

This invention relates to a camera and method for processing a latent image on a film within a camera after exposure. More particularly, the present invention relates to a camera and method wherein slide transparencies can be exposed and developed within the camera and then removed for viewing.

2. Description of the Prior Art

A number of techniques have been developed whereby photosensitive material can be exposed within a camera and then developed and transferred to an image-receiving sheet to provide a positive print. The development of cameras which can process slide transparencies, however, has not been undertaken to any great extent. U.S. Pat. No. 3,225,670 to M. Friedman et al. is directed to a 35 mm. system in which separate slide transparencies are loaded in an exposure chamber of a camera with leaders extending through a processing chamber and out of the camera. After exposure, each slide transparency is successively pulled into the development chamber, causing a processing fluid, contained in a single rupturable pod, to be spread across the transparency. After an appropriate development period, the transparency is pulled from the camera for viewing. Such a camera has the potential disadvantage that the wrong leader may be pulled or that more than one leader may be pulled at the same time, jamming the slide transparencies in the camera mechanism. Furthermore, no means is provided in such a system for utilizing more than one developing agent, use of only one developing agent posing the added disadvantage of increasing the complexity of the photographic chemistry involved.

SUMMARY OF THE INVENTION

In a camera according to the present invention, a plurality of unexposed transparency units can be mounted in a storage chamber adjacent to an exposing and processing chamber. By means of a slide mechanism, the unexposed transparency units can be brought sequentially into exposure position, and, after exposure, a pod containing a viscous developing agent or fluid can be broken and the agent or fluid spread across the transparency by the slide mechanism as it is moved to a position to engage the next transparency unit in the storage chamber. After a suitable processing period, the slide mechanism can again be moved so that the next transparency unit moved into the exposing and processing chamber. During this movement, the first transparency unit is pushed out of the exposing and processing chamber and out of the camera through a slit in the side of the camera. By use of pressure-applying means adjacent to the slit, a second pod on the first transparency unit can be broken so that a second developing agent, such as a fixing fluid, is distributed across the transparency of that unit. In one embodiment, the means adjacent to the slit for spreading the second developing agent may comprise a single roller which cooperates with a surface on the exposing and processing chamber for rupturing the second pod and spreading the second developing agent. In another embodiment, two spaced rollers may be utilized. It will be understood that the term "transparency", as used herein, refers to the exposure film area, either in its exposed, unexposed, or developed condition.

Additional novel features of this invention will become apparent from the following description, taken in conjunction with the accompanying drawings.

DESCRIPTION OF THE PREFERRED EMBODIMENTS

Figure 1:
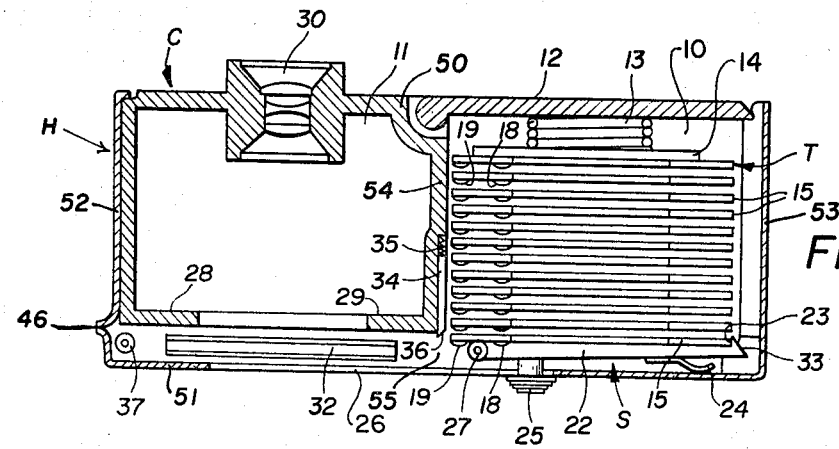
FIG. 1 is a longitudinal section through a camera constructed in accordance with this invention, showing slide transparency units mounted in a storage chamber prior to use.

In accordance with this invention, a camera C is provided in which a transparency unit can be developed immediately after exposure. As shown in FIG. 1, camera C comprises a housing H having a pair of spaced sidewalls 50 and 51 interconnected by a pair of spaced end walls 52 and 53, with a center wall 54 extending from sidewall 50 toward sidewall 51 to divide housing H into a storage chamber 10 and an adjacent exposure chamber 11. The end of center wall 54 extending toward sidewall 51 terminates short of sidewall 51 to provide a passageway 55 through which a slide mechanism S can transport a slide transparency unit from storage chamber 10 into exposure chamber 11. Conveniently, chamber 10 is provided with a door 12 for receiving a plurality of slide transparency units T, which are urged toward slide mechanism S by a spring 13 bearing against a plate 14. Of course, the slide transparencies may be mounted in a suitable magazine or other device for supplying them to the camera, as desired.

Figure 4:
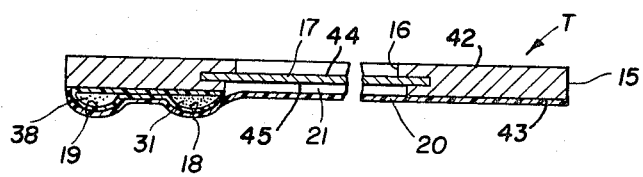
FIG. 4 is a longitudinal section through one of the transparency units of FIG. 1, showing further details thereof.

The transparency unit, as best seen in FIG. 4, may include a mount 15 having planar surfaces 42 and 43 and a central opening 16 across which a transparency 17 having opposing surfaces 44 and 45, extends. A pair of rupturable pods 18 and 19 are located at one side of opening 16 and held in position against one of the planar surfaces by a strippable sheet or layer 20 extending over the pods and opening. Thus, when the pods are ruptured, as described below, viscous developing agents, contained therein, will be spread across transparency 17 within space 21 formed between the transparency and strippable sheet or layer 20.

A reciprocative means, such as slide mechanism S, is provided with a body 22 having a lip or finger 23 at one end for engaging an edge of a transparency unit to be moved or transported from storage chamber 10 into exposure chamber 11, said finger being urged toward its unit engaging position by resilient means such as leaf spring 24. Slide mechanism S, hereafter referred to simply as slide S, is provided with an operating handle 25 which extends through a slot 26 in a sidewall of the camera housing. The end of body 22 opposite finger 23 is provided with a roller 27 which serves as a pressure means to rupture a pod on an exposed transparency unit and to distribute a developing agent in the pod in a manner to be described below.

Figure 2:
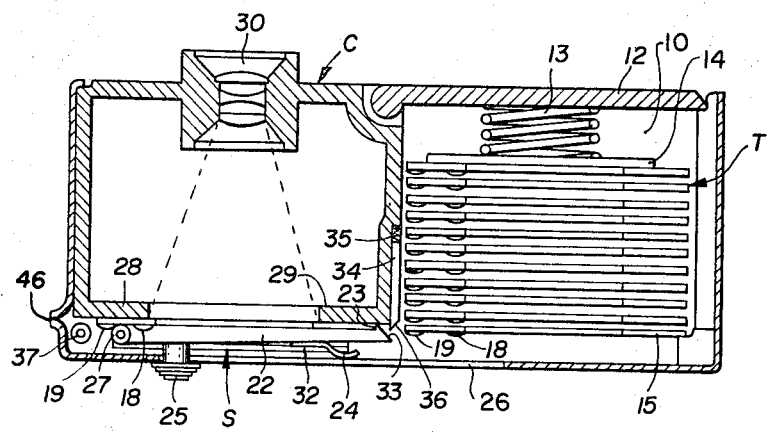
FIG. 2 is a longitudinal section, similar to FIG. 1, showing a transparency unit in exposure position.
Figure 3:
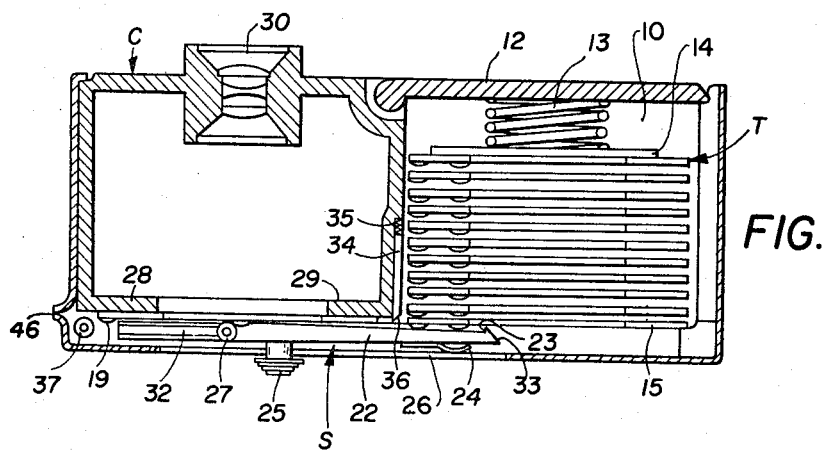
FIG. 3 is a longitudinal section, similar to FIGS. 1 and 2, showing a slide mechanism spreading a developing agent from a first pod on unexposed transparency unit across the transparency of that unit as the slide moves back into the storage chamber to engage another unit.
Figure 5:
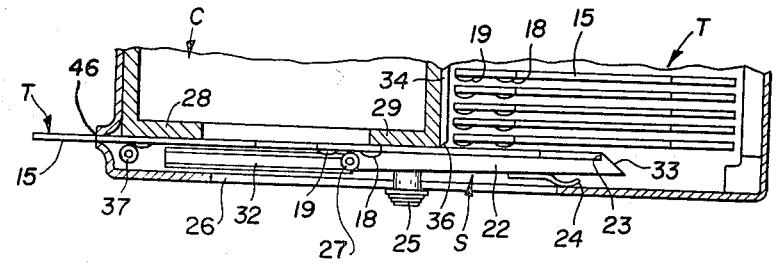
FIG. 5 is a fragmentary, longitudinal section showing a second transparency unit being moved from the storage chamber into the exposing and processing chamber and forcing the first, exposed unit past a roller and through a slot in the camera wall so that a second pod on the exposed unit containing a second developing agent, such as a fixing fluid, is ruptured and the agent therein spread across the exposed transparency.
Figure 6:
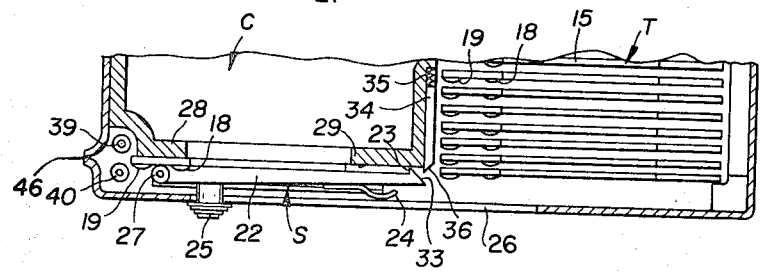
FIG. 6 is a fragmentary, longitudinal section, similar to FIG. 5, showing an alternative embodiment wherein a pair of spaced rollers are utilized for spreading the second developing agent as the exposed transparency unit is ejected from the camera.

To position one of transparency units T for exposure, operating handle 25 is pushed to the left, as viewed in FIGS. 1 and 2, so that finger 23 pulls a transparency unit from the storage chamber into the exposure chamber as shown in FIG. 2. Leaf spring 24 on body 22 urges the transparency unit against abutments 28 and 29 so that the unit is held in the correct focal plane for exposure to a light image transmitted through the lens system 30. Slide S remains in the left-hand position shown in FIG. 2 until the transparency has been exposed. After exposure, slide S is moved to the right, as viewed in FIGS. 2 and 3, causing pod 18 to be squeezed between roller 27 and abutment 28 to be ruptured. The developing agent 31 contained in pod 18 is evenly distributed across transparency 17 by roller 27. So that roller 27 can be held firmly against the transparency unit during this movement, a guide 32 may be provided which is engaged by the edge of the slide. The transparency may be supported during the spreading of the fluid developing agent by a suitable platen or other means (not shown) if desired to assure even distribution of the agent. Conveniently, when slide S is moved to the right to engage a succeeding transparency unit in the storage chamber, a beveled edge 33 adjacent to finger 23 will cause body 22 to be guided over the left edge of said succeeding unit as slide S approaches the right-hand position shown in FIG. 1. Also, roller 27 will roll across the pod 19 on said succeeding unit so that roller 27 will then rest in the space between the pods 18 and 19 on said nut. Because of the clearance provided for roller 27 and since guide 32 terminates short of the storage chamber, roller 27 will not engage pod 19 on said succeeding unit with sufficient pressure to rupture said pod. During movement to the right, as viewed in FIG. 3, the exposed transparency unit will not be moved back into the storage chamber because an edge of that unit will be engaged by a locking member or plate 34 which is urged toward slide S by a spring means 35 so that plate 34 will engage the edge of the exposed transparency unit. When a succeeding, unexposed transparency unit is being moved into exposure position, however, such unit will engage cam surface 36 on locking plate 34, thereby forcing plate 34 in the opposite direction, against the force of spring means 35, so that the succeeding unit can be moved into exposure position. Slide S will remain in the storage chamber until a suitable processing time period has elapsed. Then slide S may again be moved to the left, as viewed in FIG. 5, to bring the next transparency unit T into position. Since the next unit is in the same plane as the exposed and now at least partially developed unit, the next unit will push the exposed and at least partially developed unit out of the camera through light-tight slit 46. Conveniently, the camera is provided with a second pod-rupturing roller 37 which is spaced from abutment 28, so that the pod 19 on said exposed and at least partially developed unit containing a second developing agent such as a fixing fluid 38, will be ruptured when passed between roller 37 and abutment 28, which supported said unit during exposure, to spread the second developing agent or fluid 38 across the transparency 17 of said unit as that unit is forced out of the camera through slit 46. After removal of the unit from the camera, sheet 20 together with ruptured pods 18 and 19 and the residue of developing agents 31 and 38 may be stripped from the unit to render the unit ready for viewing.

Figure 7:
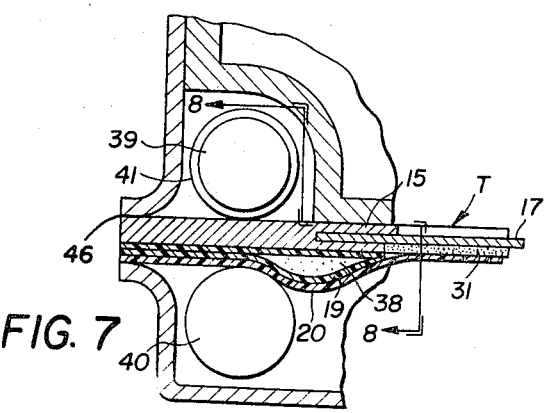
FIG. 7 is an enlarged, fragmentary section of a portion of FIG. 6, showing how the pair of rollers cooperate to rupture the second pod prior to spreading the second developing agent across the exposed transparency.
Figure 8:
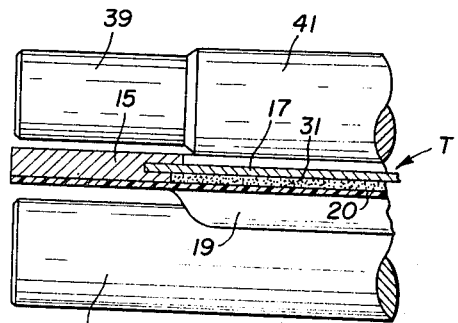
FIG. 8 is a fragmentary, offset section, taken along line 8–8 of FIG. 7, showing the position of the pair of rollers as they engage the marginal edge of the exposed transparency unit.
Figure 9:
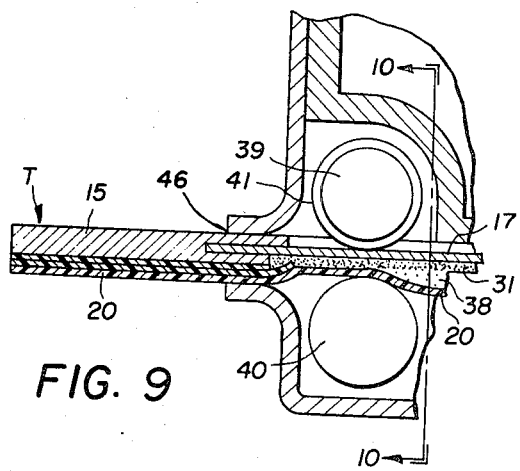
FIG. 9 is an enlarged, fragmentary section, similar to FIG. 7, showing the position of the pair of rollers as the exposed transparency moves between them and the second developing agent is spread.
Figure 10:
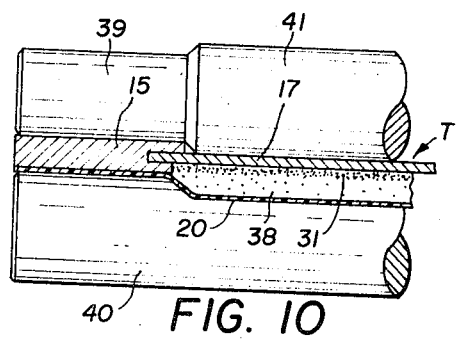
FIG. 10 is a fragmentary section, taken along line 10–10 of FIG. 9, showing the relative position of the rollers when they are disposed over the transparency.

An alternative embodiment is shown in FIGS. 6—10 having a pair of spaced rollers 39 and 40 for squeezing and rupturing pod 19 and spreading developing agent 38 contained therein. Roller 39 is conveniently provided with a raised center portion 41 which rides over mount 15, as shown in FIGS. 7 and 8, and then down onto the surface of the transparency 17, as shown in FIGS. 9 and 10. Thus, raised portion 41 of roller 39 acts as a backing for the transparency so that roller 40 can evenly spread the developing agent over the entire surface of the transparency. Otherwise it would be necessary to use a much larger quantity of developing agent to ensure that all portions of the transparency receive said agent.

From the foregoing, it can be seen that the novel features of this invention are significant. A camera has been provided having a storage chamber for unexposed transparency units and an exposure chamber adjacent thereto. An unexposed transparency unit can be moved from the storage chamber to the exposure chamber by means of a slide mechanism, or slide, having a finger at one end which engages an edge of the unexposed unit to move that unit into its exposure position. After exposure, the slide is returned to the storage chamber to engage the next transparency unit to be exposed. During this movement a first roller, located at the end of the slide opposite the finger, ruptures a first pod containing a first developing agent and spreads said developing agent over the exposed transparency. After a suitable development period, the slide is again moved from the storage chamber into the exposure chamber to move the next succeeding unit into its exposure position. This movement forces the exposed unit past a second roller to rupture a second pod containing a second developing agent, which is then spread across the exposed transparency as the unit carrying that transparency is moved out of the camera through a light-tight slit. In one embodiment, the second roller cooperates with an abutment on the camera to perform this function. In another embodiment, a third roller is spaced from the second roller and is provided with a raised surface which engages the transparency and serves as a backing therefor to ensure even distribution of the second developing agent by the second roller.

The invention has been described in detail with particular reference to preferred embodiments thereof, but it will be understood that variations and modifications can be effected within the spirit and scope of the invention as described hereinabove and as defined in the appended claims.

I claim:

1. A camera for exposing and developing slide transparency units, each unit including a transparency and a rupturable pod containing a developing agent adjacent said transparency, said camera comprising:
   an exposure chamber;
   a transparency unit storage chamber adjacent said exposure chamber for receiving a plurality of unexposed transparency units;
   a passageway interconnecting said chambers, through which passageway each of said transparency units can be transported from said storage chamber to said exposure chamber;
   reciprocative means mounted for movement through said passageway from one of said chambers to the other of said chambers and engageable with an unexposed transparency unit during movement of said unit from said storage chamber to said exposure chamber;
   rupture means engageable with said pod of said unit after exposure of said unit for rupturing said pod and causing said developing agent in said pod to be spread across said transparency of said unit; and
   means for preventing the rupturing of pods on units in said storage chamber when said reciprocative means moves to said storage chamber.

2. A camera for exposing and developing slide transparency units, each unit including a transparency and a rupturable pod containing a developing agent adjacent said transparency, said camera comprising:
   an exposure chamber;

a transparency unit storage chamber adjacent said exposure chamber for receiving a plurality of unexposed transparency units;

a passageway interconnecting said chambers, through which passageway each of said transparency units can be transported from said storage chamber to said exposure chamber; and reciprocative means mounted for movement through said passageway from one of said chambers to the other of said chambers, engageable with an unexposed transparency unit during movement of said unit from said storage chamber to said exposure chamber, and engageable with said pod of said unit during movement of said reciprocative means from said exposure chamber to said storage chamber for rupturing said pod and spreading said developing agent in said pod across said transparency of said unit.

3. A camera for exposing and developing slide transparency units, each unit including a transparency and a rupturable pod containing a developing agent adjacent said transparency, said camera comprising:

an exposure chamber;

a transparency unit storage chamber adjacent said exposure chamber for receiving a plurality of unexposed transparency units;

a passageway interconnecting said chambers, through which passageway each of said transparency units can be transported from said storage chamber to said exposure chamber;

reciprocative means mounted for movement through said passageway from one of said chambers to the other of said chambers and engageable with an unexposed transparency unit for transporting said unit from said storage chamber to said exposure chamber;

rupture means engageable with said pod of said unit after exposure of said unit for rupturing said pod and causing said developing agent in said pod to be spread across said transparency of said unit; and means for preventing the rupturing of pods on units in said storage chamber when said reciprocative means moves to said storage chamber.

4. A camera for exposing and developing slide transparency units, each unit including a transparency and a rupturable pod containing a developing agent adjacent said transparency, said camera comprising:

an exposure chamber;

a transparency unit storage chamber adjacent said exposure chamber for receiving a plurality of unexposed transparency units;

a passageway interconnecting said chambers, through which passageway each of said transparency units can be transported from said storage chamber to said exposure chamber; and reciprocative means mounted for movement through said passageway from one of said chambers to the other of said chambers, engageable with an unexposed transparency unit for transporting said unit from said storage chamber to said exposure chamber, and engageable with said pod of said unit during movement of said reciprocative means from said exposure chamber to said storage chamber for rupturing said pod and spreading said developing agent in said pod across said transparency of said unit.

5. A camera as set forth in claim 4 further including means engageable with a transparency unit in said exposure chamber for preventing movement of said unit into said storage chamber during movement of said reciprocative means from said exposure chamber to said storage chamber.

6. A camera as set forth in claim 4 wherein said reciprocative means includes a finger for engaging an edge of said unit during movement of said reciprocative means from said storage chamber to said exposure chamber to move said transparency unit therewith.

7. A camera as set forth in claim 4 further including a transparency unit support in said exposure chamber for supporting a transparency unit during exposure, said reciprocative means being mounted for squeezing said pod between said support and said reciprocative means to rupture said pod and spread said developing agent during movement of said reciprocative means from said exposure chamber to said storage chamber.

8. A camera as set forth in claim 4 wherein said reciprocative means includes a roller engageable with said pod for rupturing said pod during movement of said reciprocative means from said exposure chamber to said storage chamber.

9. A camera as set forth in claim 4 further including:

a cam surface on said reciprocative means engageable with an edge of a transparency unit in said storage chamber during movement of said reciprocative means to said storage chamber for urging said reciprocative means in a direction away from said transparency unit in said storage chamber to permit sliding movement of said reciprocative means over said transparency unit in said storage chamber; and biasing means engageable with said reciprocative means and urging said reciprocative means in a direction toward said transparency unit in said storage chamber.

10. A camera for exposing and developing slide transparency units, each unit including a transparency and first and second rupturable pods containing first and second developing agents, respectively, said pods being adjacent to but spaced from each other and adjacent to said transparency, said camera comprising:

an exposure chamber;

a transparency unit storage chamber adjacent to said exposure chamber for receiving a plurality of unexposed transparency units;

a passageway interconnecting said chambers, through which passageway each of said transparency units can be transported from said storage chamber to said exposure chamber;

reciprocative means mounted for movement through said passageway from one of said chambers to the other of said chambers, engageable with an unexposed transparency unit for transporting said unit from said storage chamber to said exposure chamber, and engageable with said first pod of said unit during movement of said reciprocative means from said exposure chamber to said storage chamber for rupturing said first pod and spreading said first developing agent in said first pod across said transparency of said unit;

a slit in said exposure chamber spaced from said passageway, through which slit an exposed transparency unit can be pushed by a succeeding unexposed transparency unit as said succeeding unit is moved into said exposure chamber; and pod rupturing means mounted in said exposure chamber adjacent to said slit for rupturing said second pod of said exposed unit and for spreading said second developing agent in said second pod across said transparency of said exposed unit when said exposed unit is pushed through said slit by movement of said succeeding unit into said exposure chamber.

11. A camera as set forth in claim 10 wherein said pod rupturing means includes:

a first roller mounted adjacent to said slit; and an abutment mounted adjacent to said slit and spaced from and opposing said first role roller so that said exposed transparency unit can be pushed between said first roller and said abutment before said exposed unit is pushed through said slit.

12. A camera as set forth in claim 11 wherein said abutment includes a second roller opposing said first roller, said first and second rollers cooperating to rupture said second pod and spread said second developing agent across said transparency as said exposed unit is pushed between said rollers.

13. A camera as set forth in claim 12 for exposing and developing slide transparency units, each unit further including a mount having planar surfaces and a central opening across which said transparency extends, said transparency having first and second surfaces spaced from one of said planar surfaces of said mount, wherein one of said first and second rollers of said camera includes:
 opposite portions having one diameter for rolling across said one planar surface of said mount; and
 a center portion having a diameter larger than said one diameter for fitting within said central opening of said mount and for engaging said first surface of said transparency as the other of said rollers spreads said second developing agent across said second surface of said transparency.

14. A camera for exposing and developing slide transparency units, each unit including a transparency and a rupturable pod containing a developing agent to adjacent said transparency, said camera comprising:
 an exposure chamber;
 a transparency unit storage chamber adjacent said exposure chamber for receiving a plurality of said transparency units;
 a passageway interconnecting said chambers, through which passageway each of said transparency units can be transported from said storage chamber to said exposure chamber;
 a slide mounted for reciprocative movement through said passageway from one of said chambers to the other of said chambers;
 a finger on said slide for engaging a transparency unit to transport said transparency unit from said storage chamber to said exposure chamber; and
 rupture means on said slide for rupturing said pod of said unit and for spreading said developing agent in said pod across said transparency of said unit during movement of said slide from said exposure chamber to said storage chamber.

15. A camera for exposing and developing photographic transparency units, each unit including a generally rectangular mount having planar surfaces and a central opening, a relatively thin transparency mounted across said opening and spaced from said planar surfaces, a rupturable pod containing a developing agent adjacent one of said planar surfaces and adjacent said opening, and a strippable layer extending over said opening and said one planar surface, said camera comprising:
 a housing having a pair of spaced sidewalls interconnected by a pair of spaced end walls;
 a center wall extending from one of said sidewalls toward the other of said sidewalls to divide said housing into an exposure chamber and a storage chamber, said storage chamber being suitable for receiving a plurality of unexposed transparency units, said center wall terminating in an end spaced from said other sidewall defining a passageway through which said transparency units can be transported sequentially from said storage chamber to said exposure chamber;
 a slit in the one of said end walls defining said exposure chamber opposite said passageway, through which slit an exposed transparency unit can be pushed after development;
 supporting means between said passageway and said slit for supporting a transparency unit in position for exposure and development; and
 a slide mounted for reciprocative movement through said passageway from one of said chambers to the other of said chambers, said slide being engageable with an unexposed transparency unit to transport said unit from said storage chamber to said exposure chamber and engageable with the pod of said unit after exposure during movement of said slide from said exposure chamber to said storage chamber to rupture said pod and spread the developing agent in said pod across the transparency of the exposed unit between said transparency and the strippable layer of said exposed unit, the next movement of said slide from said storage chamber to said exposure chamber causing the succeeding unexposed unit to push the exposed and developed unit through said slit.

16. A camera as set forth in claim 15 further including:
 a recess in said center wall;
 a movable locking member in said recess engageable with an edge of a transparency unit in said exposure chamber to prevent movement of said transparency unit into said storage chamber during movement of said slide from said exposure chamber to said storage chamber; and
 biasing means urging said locking member toward said other side wall.

17. A camera as set forth in claim 16 wherein said locking member includes an end having a cam surface engageable by an edge of a transparency unit being transported from said storage chamber through said passageway into said exposure chamber to move said locking member into said recess against said biasing means so that said transparency unit can be transported into said exposure chamber.

18. A camera as set forth in claim 15 wherein said other sidewall includes means defining a longitudinal slot and wherein said slide includes:
 a longitudinal body having two ends;
 a finger at one end of said body engageable with an edge of the mount of an unexposed transparency unit opposite the pod of said unit to transport said unit from said storage chamber to said exposure chamber;
 developing agent spreading means at the other end of said body engageable with said pod after exposure of said unit during movement of said slide from said exposure chamber into said storage chamber for rupturing said pod and spreading the developing agent in said pod across the transparency of the exposed unit; and
 an operating handle extending through said slot for moving said slide from one of said chambers to the other of said chambers.

19. A camera as set forth in claim 18 wherein said slide further includes:
 a cam surface on said one end of body engageable by an edge of a transparency unit in said storage chamber during movement of said slide to said storage chamber to urge said body toward said other sidewall so that said body can slide over said transparency unit during movement of said slide into said storage chamber; and
 a spring on said body engageable by said other sidewall to bias said body toward said one sidewall.

20. A camera as set forth in claim 18 wherein said developing agent spreading means includes a roller.

21. A camera for exposing and developing photographic transparency units, each unit including a generally rectangular mount having first and second planar surfaces and a central opening, a relatively thin transparency having first and second surfaces extending across said opening and spaced from said planar surfaces, a first rupturable pod containing a first developing agent adjacent to said first planar surface and adjacent to said opening, a second rupturable pod containing a second developing agent adjacent to said first planar surface and adjacent to but spaced from said first pod, said first pod being located between said second pod and said opening, and a strippable layer extending over said opening and said first planar surface, said camera comprising:
 a housing having a pair of spaced sidewalls interconnected by a pair of spaced end walls;
 a center wall extending from one of said sidewalls toward the other of said sidewalls to divide said housing into an exposure chamber and a storage chamber, said storage chamber being suitable for receiving a plurality of unexposed transparency units, said center wall terminating in an end spaced from said other sidewall defining a passageway through which said transparency units can be transported sequentially from said storage chamber to said exposure chamber;

a slit in the one of said end walls defining said exposure chamber opposite said passageway, through which slit an exposed transparency unit can be pushed after development;

supporting means between said passageway and said slit for supporting a transparency unit in position for exposure and development;

a slide mounted for reciprocative movement through said passageway from one of said chambers to the other of said chambers, said slide being engageable with an unexposed transparency unit to transport said unit from said storage chamber to said exposure chamber and engageable with said first pod of said unit after exposure during movement of said slide from said exposure chamber to said storage chamber to rupture said first pod and spread said first developing agent in said first pod across said transparency of the exposed unit between said transparency and said strippable layer of said exposed unit, the next movement of said slide from said storage chamber to said exposure chamber causing the succeeding unexposed unit to push the exposed and at least partially-developed unit through said slit;

a first roller spaced from said supporting means adjacent to said slit; and pressure means adjacent to said slit and spaced from said first roller for cooperating with said first roller to rupture a said second pod of said exposed and at least partially-developed unit and to spread said second developing agent in said second pod across said transparency between said transparency and said strippable layer when said exposed and at least partially developed unit is pushed from said exposure chamber through said slit.

22. A camera as set forth in claim 21 wherein said pressure means is an integral part of said supporting means.

23. A camera as set forth in claim 21 wherein said pressure means includes a second roller.

24. A camera as set forth in claim 23 wherein said second roller includes:

opposite end portions having one diameter for rolling across said second planar surface of said mount of said exposed and at least partially developed unit; and a center portion having a diameter larger than said one diameter for fitting within said central opening of said mount and for engage engaging said first surface of said transparency when said first roller spreads said second developing agent across said second surface of said transparency.

25. A camera for exposing and developing photographic transparency units, each unit including a generally rectangular mount having planar surfaces and a central opening, a relatively thin transparency extending across a said opening and spaced from said pal planar surfaces, a first rupturable pod containing a first developing agent adjacent to one of said planar surfaces and adjacent to said opening, a second rupturable pod containing a second developing agent adjacent to said one planar surface and adjacent to but spaced from said first pod, said first pod being located between said second pod and said opening, and a strippable layer extending over said opening and said one planar surface, said camera comprising:

a housing having a pair of spaced sidewalls interconnected by a pair of spaced end walls;

a center wall extending from one of said sidewalls toward the other of said sidewalls to divide said housing into an exposure chamber and a storage chamber, said storage chamber being suitable for receiving a plurality of unexposed transparency units, said center wall terminating in an end spaced from said other sidewall defining a passageway through which transparency units can be transported sequentially from said storage chamber to said exposure chamber;

a light-tight slit in the one of said end walls defining said exposure chamber opposite said passageway, through which slit an exposed transparency unit can be pushed after at least partial development;

supporting means between said passageway and said slit for supporting a transparency unit in position for exposure and at least partial development;

a slide having a longitudinal body with two opposite ends, said slide being mounted for reciprocative movement through said passageway from one of said chambers to the other of said chambers;

a finger adjacent to one end of said body engageable with an edge of said mount of an unexposed transparency unit opposite said pods of said unit to transport said unit from said storage chamber to said exposure chamber;

a first roller adjacent to the other end of said body engageable with said first pod of said unit after exposure during movement of said slide from said exposure chamber to said storage chamber to rupture said first pod and spread said first developing agent in said first pod across said transparency of the exposed unit between said transparency and said strippable layer of said exposed unit;

a cam surface on said one end of said body engageable by an edge of a transparency unit in said storage chamber during movement of said slide to said storage chamber to urge said body toward said other sidewall so that said body can slide over said transparency unit during movement of said slide to said storage chamber;

a spring on said body engageable by said other sidewall to bias said body toward said one sidewall, the next movement of said slide from said storage chamber to said exposure chamber causing the succeeding unexposed unit to push the exposed and at least partially developed unit through said slit;

a recess in said center wall;

a movable locking member in said recess engageable with an edge of a transparency unit in said exposure chamber to prevent movement of said transparency unit into said storage chamber during movement of said slide from said exposure chamber to said storage chamber;

an end on said locking member having a cam surface engageable by an edge of a transparency unit being transported from said storage chamber through said passageway into said exposure chamber to move said locking member into said recess;

biasing means urging said locking member toward said other sidewall;

a second roller spaced from said supporting means adjacent to said slit; and pressure means adjacent to said slit and spaced from said second roller for cooperating with said second roller to rupture said second pod of an exposed and at least partially developed unit and to spread said second developing agent in said second pod across said transparency between said transparency and said strippable layer when said exposed and at least partially developed unit is pushed from said exposure chamber through said slit.

26. A method of exposing and developing photographic transparency units, each unit including a transparency, first and second rupturable pods containing first and second developing agents, respectively, adjacent said transparency, and a strippable layer extending over said transparency, said method comprising the steps of:

inserting a transparency unit into said exposure chamber;

exposing the transparency of said unit to a photographic image;

rupturing the first pod of said unit and spreading the first developing agent in said first pod across said transparency between the strippable layer of said unit and said transparency;

after a first predetermined development period, rupturing the second pod of said unit and spreading the second developing agent in said second pod across said transparency;

removing said transparency unit from said exposure chamber; and stripping said layer and said pods from said unit.

27. A method as set forth in claim 26 wherein the rupturing of said second pod and the spreading of said second developing agent occur substantially simultaneously with the removing of said unit from said exposure chamber.

28. A method as set forth in claim 27 wherein said substantially simultaneous steps also occur substantially simultaneously with the inserting of another transparency unit into said exposure chamber.

29. A method as set forth in claim 26 wherein inserting another transparency unit into said exposure chamber pushes the exposed unit out of said exposure chamber and ruptures the second pod of said exposed unit and spreads the second developing agent in said second pod across the transparency of said exposed unit.

30. A method of exposing and developing transparency units; each unit including a transparency, a rupturable pod containing a developing agent adjacent said transparency, and a strippable layer extending over said transparency, in a camera having a storage chamber and an exposure chamber, said method comprising the steps of:

inserting a transparency unit into said storage chamber;

transporting said transparency unit into said exposure chamber;

exposing the transparency of said unit in said exposure chamber;

rupturing the pod of said unit while said unit is in said exposure chamber, and spreading the developing agent in said pod across said transparency between the strippable layer of said unit and said transparency; and removing said transparency unit from said exposure chamber after a predetermined development period.

31. A method as set forth in claim 30 including the further step of stripping said layer and said pod from said unit.

32. A method as set forth in claim 30 including the further step of removing said transparency unit from said exposure chamber by the insertion of another transparency unit into said exposure chamber.

33. A camera for exposing and initiating the processing of film units, the units having at least one rupturable pod containing a processing solution, the camera comprising:

an objective for transmitting actinic light to a film unit to expose the unit, said objective having a focal plane;

means defining an exposure chamber in axial alinement with said objective, said exposure chamber including means for positioning a film unit for exposure at said focal plane;

means defining a supply chamber adjacent said exposure chamber for holding a stack of unexposed film units, said supply chamber having a rearward portion adjacent said focal plane;

means defining a passageway interconnecting said rearward portion and said exposure chamber; and a reciprocating mechanism movable from a first location in said exposure chamber to a second location in said supply chamber and back to said first location, said mechanism having means for rupturing a pod of processing solution on a film unit in said exposure chamber and for spreading the processing solution across the unit when said mechanism is moved from the first location to the second location, and means for engaging a film unit in said rearward portion of said supply chamber and for transporting the engaged unit to the exposure chamber, when said mechanism is moved from the second location to the first location.

34. A method for exposing and processing film units, each unit having a rupturable pod containing a solution for processing exposed units, in a camera having an exposure chamber with a focal plane and means for positioning a film unit in the focal plane, and a film unit supply chamber adjacent the exposure chamber, the supply chamber having a rearward portion interconnected with the focal plane and having means for urging film units therein towards the rearward portion, the method comprising the steps of:

inserting a film unit in the supply chamber;

transporting the film unit to the exposure chamber and exposing the unit;

rupturing the pod of processing solution on the exposed pod and spreading the released solution across the film unit; and transporting a subsequent unexposed film unit from the supply chamber to the exposure chamber and simultaneously transporting the exposed unit out of the exposure chamber.

35. A camera according to claim 33 further comprising means for urging the stack of unexposed units in said supply chamber toward said rearward portion.

PO-1050
(5/69)

UNITED STATES PATENT OFFICE
CERTIFICATE OF CORRECTION

Patent No. 3,541,937        Dated November 24, 1970

Inventor(s) Hubert Nerwin

It is certified that error appears in the above-identified patent and that said Letters Patent are hereby corrected as shown below:

Col. 7, line 18, delete "to".
Col. 8, line 43, after "of" insert --said--.
Col. 9, line 30, delete "a";
       line 48, delete "engage";
       line 55, delete "a";
       line 56, delete "pal".

Signed and sealed this 20th day of June 1972.

(SEAL)
Attest:

EDWARD M. FLETCHER, JR.
Attesting Officer

ROBERT GOTTSCHALK
Commissioner of Paten